United States Patent [19]

Collier et al.

[11] 3,708,002
[45] Jan. 2, 1973

[54] MALTING OF DEHUSKED GRAIN

[75] Inventors: John Anthony Collier; William Aidan Buckley, both of Ipswich, Suffolk, England

[73] Assignee: Pauls and Sandars Limited, London, England

[22] Filed: May 11, 1970

[21] Appl. No.: 36,468

[30] Foreign Application Priority Data

May 13, 1969 Great Britain.....................24,305/69

[52] U.S. Cl.................................. 99/50, 99/233.1
[51] Int. Cl. ............................................B02b 3/00
[58] Field of Search..146/221.5, 221.6, 221.7, 221.8, 146/221.9; 99/50, 51, 52, 53; 195/70

[56] References Cited

UNITED STATES PATENTS 2,232,697   7/1971   Earle..................................146/221.9

FOREIGN PATENTS OR APPLICATIONS 786,973   11/1957   Great Britain............................99/53

Primary Examiner—Willie G. Abercrombie
Attorney—Beveridge and DeGrandi

[57] ABSTRACT

The invention relates to improvements in the malting of grain in which a proportion of the outer layers i.e., the husk when present and the pericarp testa is removed by mechanical treatment whereby the speed of malting is increased.

Preferably the mechanical treatment penetrates the pericarp of essentially all of the grains. The amount of the outer layer removed may be for example up to 3 percent and can be as high as 10 percent of the dry weight of the grain. The removal of larger amounts of the outer layers produces in addition to a faster malting a higher extract and a high protein content in the spent grains.

9 Claims, No Drawings

MALTING OF DEHUSKED GRAIN

The present invention relates to the malting of grain especially barley.

In the malting of grain the faster the absorption of water and the easier the access of oxygen the faster is the speed of malting. Removal of the outer layers, i.e. the husk, pericarp and testa or where no husk exists, the pericarp and testa provide such conditions and also, because of the removal of the outer layer of higher yield of extract is obtained.

Up to the present time however such removal of the outer layers has reduced the germination of the grain to the point where the use of chemical triggering compounds such as gibberellic acid becomes necessary.

It has now been found that if the removal of the outer layers is taken only to the point where no substantial reduction in the germination of the grain results, the greater speed of malting and higher extracts can be achieved even without the use of gibberellic acid.

According to the present invention therefore there is provided a method of malting grain in which grain is pretreated to remove a proportion of the husk by mechanical means, the amount of husk removed being insufficient to substantially reduce the germination of the grain. Preferably the pericarp is penetrated in substantially the whole of the grains. Thus when only small amounts of the outer layers are removed (up to 3 percent by weight of dry grain i.e. up to about 30 percent of the outer layers) the naturally stimulated production of enzymes and breakdown of the endosperm cell wall structure without the use of gibberellic acid is achieved while increasing the speed of malting. When larger amounts of the outer layers are removed i.e. up to 10 percent of the dry weight the speed of malting is substantially increased and a novel type of malt is obtained which has a much higher extract than normal malt and the spent grain has a high protein content.

If the maximum of outer layers is removed subject to not substantially altering the germination of the grain the rigidity after steeping is reduced which can render the air flow during steeping and germination and kilning more difficult to maintain than when lower amounts of the outer layers are removed.

The invention is particularly useful in the malting of barley but other cereals such as oats and rye may also be treated.

Gibberellic acid may be used in the method of the invention to further speed up the malting process where the use of such a compound is permitted. The amount of giberellic acid required is small e.g. up to 0.25 p.p.m.. Larger amounts do not appear to provide any real advantage. When gibberellic acid is to be used it is particularly preferable that the pericarp of the grains be penetrated before malting is effected in order to gain the maximum advantage.

The outer layers may be removed by an abrasive technique. The abrasion may be grain to grain friction such as that which occurs in wheat polishing prior to milling in which a paddle is used to keep the grain in motion. It may also be grain to abrasive surface such as in an entoleter or may be a combination of grain to grain friction with grain to abrasive surface friction as in a pearling machine. In each case the process is controlled to remove a predetermined amount of the outer layers according to the invention. In the case of the entoleter it is preferable to use smooth hammers with abrasive walls.

When more than 30 percent of the outer layers is to be removed the removal is preferably undertaken in two stages which successively remove about half the total husk to be removed. Thus for example although about 7 – 10 percent dry weight of the outer layers of barley may be removed (i.e. 70 – 95 percent of the total outer layers) in one pass through a pearling apparatus by suitably adjusting the controls, preferably 3 – 5 percent weight of the dry weight, (i.e. 30 – 50 percent of the outer layers) are successively removed either by two passes through the same machine or by successive passage through two machines in sequence.

The biproduct formed by removal of a proportion of the outer layers has substantially the same value as an animal feed as the original grain. Some processing loss is of course unavoidable in the removal of the outer layers but such loss is of negligible proportion.

The invention will be further illustrated by reference to the following examples:

EXAMPLE 1

Comparison of normal barley with and without G.A., and mechanically treated barley (with and without G.A.), the mechanical treatment having been performed so as not to impair germination 72 hours steeping and germination time:

|  | Normal Barley | Normal + GA | Treated | Treated + GA |
|---|---|---|---|---|
| Hot Water Extract | 93.0 | 98.1 | 106.4 | 107.8 |
| Cold Water Extract | 14.6 | 18.9 | 20.2 | 22.7 |
| Total Nitrogen | 1.47 | 1.43 | 1.45 | 1.44 |
| Permanently Soluble Nitrogen | 0.461 | 0.510 | 0.645 | 0.678 |
| Index of Modification | 31.3 | 35.6 | 44.4 | 47.0 |

96 hours steeping and germination time:

|  | Normal Barley | Normal + GA | Treated | Treated + GA |
|---|---|---|---|---|
| Hot Water Extract | 100.7 | 102.0 | 108.4 | 108.7 |
| Cold Water Extract | 20.4 | 24.0 | 27.2 | 29.6 |
| Total Nitrogen | 1.42 | 1.41 | 1.44 | 1.41 |
| Permanently Soluble Nitrogen | 0.579 | 0.664 | 0.744 | 0.746 |
| Index of Modification | 40.7 | 47.0 | 51.6 | 52.9 |

Using barley the outer layers of which had been removed to an extent as to impair germination, the following results were achieved:

102 hours steeping and germination time:

|  | Treated | Treated + GA |
|---|---|---|
| Hot Water Extract | 101.2 | 110.5 |
| Cold Water Extract | 17.8 | 27.0 |
| Total Nitrogen | 1.54 | 1.52 |
| Permanently Soluble Nitrogen | 0.53 | 0.75 |
| Index of Modification | 34.5 | 49.5 |

EXAMPLE 2

MOISTURE UPTAKE

Grain steeped for 6 hours at 18°C

| Outer Layer Removal % of dry weight | Moisture Content of Grain after steeping (%) |
|---|---|

| | |
|---|---|
| 0 | 32.5 |
| 2 | 35.5 |
| 4 | 37.1 |
| 7 | 39.9 |
| 10 | 41.5 |

We claim:

1. In a method of malting grain the improvement which comprises using grain which is pretreated, prior to malting, by a process which comprises mechanically removing a proportion of the outer layers of said grain whereby to effect an increase in the speed of malting, the amount of outer layers removed being insufficient to essentially affect the germination of the grain during malting, but sufficient to penetrate a pericarp layer in essentially all the grains treated.

2. A method as claimed in claim 1 in which the grain is barley.

3. A method as claimed in claim 1 in which an amount of the outer layers is removed equivalent to up to 3 percent by weight of the total dry weight of the grains.

4. A method as claimed in claim 3 in which an amount of the outer layers is removed equivalent to up to 10 percent by weight of the total dry weight of the grains.

5. A method as claimed in claim 1 in which the outer layers are removed by abrasion.

6. A method as claimed in claim 5 in which the abrasion is grain abrasion.

7. A method as claimed in claim 5 in which the abrasion is grains against an abrasive surface.

8. A method as claimed in claim 5 in which the abrasion is both grain to grain and grain against an abrasive surface.

9. A method as claimed in claim 3 in which an amount of the outer layers is removed equivalent to about 7–10 percent by weight of the total dry weight of the grains.

* * * * *